3,230,216
METHOD FOR THE PREPARATION OF α-SUBSTITUTED ORGANIC CARBONYL COMPOUNDS
Gilbert Stork, Leonia, N.J., assignor to Syntex Corporation, Panama, Panama, a corporation of Panama
No Drawing. Filed Mar. 27, 1963, Ser. No. 268,485
20 Claims. (Cl. 260—239.55)

This invention relates to a novel method for the preparation of α-substituted organic carbonyl compounds. More particularly, this invention relates to a novel method of introducing substituted or unsubstituted alkyl, alkenyl or aralkyl (e.g., benzyl) groups on the α-carbon atom of any enolizable organic carbonyl compound which forms a Schiff's base, e.g., an aldehyde or ketone having at least one replaceable hydrogen atom on the α-carbon atom.

Various methods of alkylating the α-carbon atom in certain aldehydes and ketones are known in the art. However, these methods are applicable only in special cases, and often lead to polyalkylation; no general method of alkylating the α-carbon atom of any enolizable organic carbonyl compound which forms a Schiff's base had been developed prior to the present invention. Thus, for example, attempts to alkylate aldehydes using alkyl halides in the presence of strong bases seldom succeed since, under these conditions, the aldehyde will generally undergo self-condensation. Similarly, the enamine method of alkylation, as shown, for example, in U.S. Patent No. 2,773,099 to Stork, cannot be considered a general method, for several reasons. First of all, it is difficult to prepare enamines of ketones other than cyclic ketones. Secondly, experience has shown that as a practical matter the enamine method is limited to alkylations involving the use of very reactive primary halides, such as α-halo ethers, esters, nitriles and ketones, allyl halides, benzyl halides and the like. Ordinary saturated primary halides do not give good yields of product, while secondary halides are largely dehydrohalogenated.

As previously indicated, the present invention relates to general method which enables any enolizable organic carbonyl compound of the character described to be alkylated to give good yields of the corresponding α-alkylated derivatives.

It is, therefore, an object of this invention to provide a novel method for the preparation of α-substituted organic carbonyl compounds.

It is also an object of this invention to provide a novel method of introducing substituted or unsubstituted alkyl, alkenyl or aralkyl groups on the α-carbon atom of any enolizable organic carbonyl compound which forms a Schiff's base.

A further object of this invention is to provide a novel method of introducing substituted or unsubstituted alkyl, alkenyl or aralkyl groups on the α-carbon atom of any enolizable aldehyde or ketone.

These and other objects of the present invention will be discussed more fully hereinbelow.

Briefly stated, the novel method of alkylating enolizable organic carbonyl compounds to produce the corresponding α-alkylated derivatives involves the steps of:

(A) condensing the organic carbonyl starting material, e.g., an enolizable aldehyde or ketone, with a primary amine to give the corresponding imine, (B) converting the imine to a metal salt thereof, e.g., an alkali metal or magnesium salt, (C) alkylating this salt with a primary or secondary alkyl, alkenyl, or aralkyl halide, sulfate or sulfonate, and (D) hydrolyzing the resulting alkylation mixture, preferably under acidic conditions, to produce the corresponding α-alkylated organic carbonyl derivative.

The method outlined above can be represented schematically in the following manner:

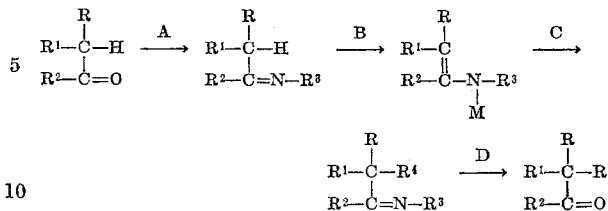

In these formulas R, $R^1$ and $R^2$ each represent hydrogen or an alkyl (including saturated and unsaturated, straight and branched-chain alkyl and cycloalkyl) or aryl (including alkaryl and aralkyl) group, e.g., methyl, ethyl, propyl, isopropyl, butyl, t-butyl, amyl, hexyl, heptyl, allyl, cyclobutyl, cyclopentyl, cyclohexyl, methylcyclohexyl, cycloheptyl, cyclohexenyl, phenyl, benzyl, tolyl, and the like, which may either be unsubstituted or substituted with one or more non-interfering substituents, e.g., protected hydroxyl groups such as alkoxy groups, protected carbonyl groups, such as enol ether or ketal groups, protected amino groups, such as dimethylamino and diethylamino, halogens, and the like; when $R^2$ is hydrogen the starting material is an aldehyde, while when $R^2$ is other than hydrogen, e.g., alkyl, the starting material is a ketone; R and $R^1$, R and $R^2$ and $R^1$ and $R^2$ taken together can also represent condensed ring structures, e.g., cyclopentane, cyclohexane, cycloheptane or higher membered rings, which can themselves be fused to form further ring structures, such as indanyl, indenyl, naphthyl, acenaphthenyl, anthryl, and cyclopentanopolyhydrophenanthryl rings, and the like, which may also either be unsubstituted or substituted with one or more non-interfering substituents, such as those mentioned hereinabove; $R^3$ usually represents an alkyl or cycloalkyl group, such as methyl, t-butyl, cyclohexyl and the like, but can also represent an aromatic group, e.g., anilino and the like; $R^4$ represents a primary or secondary alkyl (including straight- and branched-chain alkyl and cycloalkyl) or aralkyl group, such as those mentioned hereinabove in defining R, $R^1$ and $R^2$, or an alkenyl group, e.g., allyl and the like, having no α,β-ethylenic unsaturation, i.e., other than vinyl, etc., all of which may either be unsubstituted or substituted with one or more non-interfering substituents, such as those mentioned hereinabove, and M represents a metal, preferably an alkali metal or magnesium.

Step A in the reaction scheme outlined above is carried out under conditions which are so well known in the art [for example, see D. G. Norton et al., J. Org. Chem., 19, 1054 (1954); W. D. Emmons et al., J. Am. Chem. Soc., 79, 5739 (1957)], that a detailed discussion thereof is deemed unnecessary herein. This condensation reaction will preferably be carried out using azeotropic distillation to remove the water formed during the reaction. However, a drying agent, e.g., anhydrous potassium carbonate and the like, can also be used.

Any organic carbonyl compound having at least one replaceable hydrogen atom on the α-carbon atom, i.e., on a carbon atom contiguous to the carbonyl group, can be reacted with a primary amine, preferably in an inert organic solvent, such as an ether, including glycol ethers, dioxane and tetrahydrofuran, or a hydrocarbon solvent, e.g., benzene, toluene or xylene, and the like, to form the imine.

An illustrative but by no means exhaustive listing of enolizable organic carbonyl compounds which can be converted to their α-alkylated derivatives by the process of the present invention includes: acetaldehyde, propionaldehyde, isopropaldehyde, butyraldehyde, 4-methoxy-butyraldehyde, isobutyraldehyde, heptaldehyde, phenyl acetaldehyde, cyclohexane carboxaldehyde, $\Delta^3$-cyclohexene-1-carboxaldehyde, acetone, methyl ethyl ketone, methyl isopropyl ketone, methyl amyl ketone, butyrophenone, cyclopentanone, cyclohexanone, 2-methylcyclohexanone, 3-methylcyclohexanone, 4-methoxycyclohexanone, cycloheptanone, acetylcyclohexane, 5-acenaphthenyl methyl ketone, acetonaphthone, methoxy acetonaphthol, butyronaphthone, 10-methyl-$\Delta^{1,9}$-2-octalone, androstenolone 3-dihydropyranyl ether, androsterone, cholestanone, dihydrotestosterone 17-dihydropyranyl ether, progesterone 20-ketal, testosterone 17-dihydropyranyl ether, 17α-formyltestosterone 3-ketal, and the like.

The primary amine used to form the imine of the enolizable organic carbonyl compound can be any of a large variety of amines, and the choice of a particular primary amine or class of primary amines is certainly not critical. Preferably, however, t-alkyl amines such as the readily available t-butylamine, t-octyl amine, and the like will be used with aldehydes containing two hydrogen atoms on the α-carbon atom, while amines such as methylamine, cyclohexylamine, aniline, and the like will be used with other aldehydes and ketones, due primarily to the fact that good yields and relative ease of operation have been obtained when using these primary amines. The imine formed in this condensation reaction need not be isolated before subjecting it to Step B.

In step B the imine is treated with a metal compound, e.g., a basic alkali metal or magnesium compound, to form the corresponding alkali metal or magnesium salt. Included among the alkali metal compounds which can be used are strong alkali metal bases, e.g., alkali metal hydrides and amides such as lithium amide, sodium amide, sodium hydride, potassium amide, potassium hydride, and the like. Included among the magnesium compounds which can be used are Grignard reagents of the type $R_1MgX$, wherein $R_1$ represents an alkyl group and X represents halogen, e.g., methyl magnesium bromide, ethyl magnesium bromide, propyl magnesium iodide, and the like.

Salt-formation using alkali metal compounds will be restricted to those cases where the imine starting material has been formed by reacting the organic carbonyl compound with an aromatic primary amine, e.g., aniline (see Example I, infra). However, the magnesium compounds, e.g., the aforementioned Grignard reagents, can be used no matter what primary amine was used to form the imine.

Step B will be carried out in an inert organic solvent, which can be the same solvent used in the imine-forming reaction, another solvent of the type listed hereinabove, or a mixture of such solvents, at a temperature generally ranging from room temperature, i.e., about 25° C., to the reflux temperature of the reaction mixture, and preferably from about 60° C. to about 130° C. It should be noted that the choice of any particular solvent, reaction temperature or combination thereof is not critical. The amount of basic alkali metal or magnesium compound employed will generally be at least the stoichiometric amount necessary to form the imine salt, with a slight excess, e.g., an excess of up to about 10% by weight, based on the weight of the imine, being preferred to insure complete reaction. This reaction will be allowed to continue until the evolution of gas from the reaction mixture ceases, indicating substantially complete salt formation.

The imine salt obtained from step B is alkylated by reacting it, in an inert organic solvent, with an alkylating agent which can be a primary or secondary alkyl (including straight- and branched-chain alkyl and cycloalkyl), alkenyl (having no α,β-ethylenic unsaturation) or aralkyl halide, sulfate or sulfonate, which may either be unsubstituted or substituted with one or more non-interfering substituents, such as those mentioned hereinabove. The solvent employed can be the same solvent used in Step A or B, inasmuch as the product of step B need not be isolated before subjecting it to step C, another solvent of the type listed hereinabove, or a mixture of such solvents. Included among the alkylating agents which can be used in step C are such compounds as: methyl bromide, methyl iodide, ethyl bromide, propyl chloride, isopropyl iodide, butyl bromide, butyl iodide, heptyl bromide, cyclopentyl bromide, cyclohexyl chloride, 1-iodo-3-methyl-cyclohexane, 1-bromocyclohexene-2, allyl bromide, 1-bromo-2-butene, 1,3-dichloro-2-butene, benzyl chloride, p-isopropylbenzyl chloride, β-phenylethyl bromide, dimethyl sulfate, diethyl sulfate, methyl propyl sulfate, dibenzyl sulfate, methyl p-toluenesulfonate, butyl p-toluenesulfonate, and the like. Parenthetically, it should be noted that where the alkylating agent is a non-allylic chloride or bromide, it can be used together with any Grignard reagent used to form the imine salt, i.e., in such a case steps B and C can be combined.

Ordinarily, at least one equivalent of the particular alkyl, alkenyl or aralkyl halide, sulfate or sulfonate will be employed, with a slight excess, e.g., an excess of up to about 10% by weight, based on the weight of the imine salt, being preferred to insure complete reaction. The reaction can be carried out under atmospheric, subatmospheric or superatmospheric pressure, at a temperature ranging from room temperature to the reflux temperature of the reaction mixture, and preferably from about 60° C. to about 130° C., for a period of time ranging from about 4 hours to about 24 hours or longer, depending on the reactivity of the particular alkylating agent employed, the boiling point of the solvent, and the like.

Upon completion of the alklyation step, the reaction mixture is hydrolyzed with water, preferably using an acid catalyst, such as hydrochloric, sulfuric, or acetic acid and the like, or mixtures of such acids and their salts, e.g., an aqueous solution of acetic acid and sodium acetate, at a temperature ranging from room temperature to about 100° C., thus regenerating the carbonyl group and giving the α-alkylated derivative corresponding to the organic carbonyl starting material. This final product is then recovered in the usual manner, e.g., by distillation.

Higher or lower temperatures and longer or shorter reaction times than those set forth hereinabove can be used in any of steps B, C and D; the conditions given are merely the most practical operating conditions. Thus, the choice of any particular reaction condition is not considered critical, and will be governed primarily by ease of operation and economic factors.

Many of the α-alkylated organic carbonyl compounds which formerly were difficult to prepare but which are now readily obtainable in good yields through the practice of the present invention are of considerable importance in such fields as perfumery and pharmaceuticals. For example, alkylation of 3-methylcyclohexanone with isopropyl iodide by the present method yields menthone, alkylation of isobutyraldehyde with benzyl halides or substituted benzyl halides, e.g., benzyl chloride, gives α,α'-dimethylphenylpropionaldehyde and alkylated derivatives thereof, which are important perfume constituents, and alkylation of dihydrotestosterone with methyl iodide results in 2-methyldihydrotestosterone, a valuable therapeutic steriod.

An additional advantage found in the process of the present invention is the fact that it permits the preparation of monoalkylated derivatives in good yield. Prior art alkylation methods, as previously indicated, often lead to polyalkylation and, therefore, to difficultly separable mixtures of alkylated derivatives.

In order that those skilled in the art may more fully understand the present invention, the following examples are set forth. These examples are given solely for the purpose of illustration, and should not be considered as expressing limitations unless so set forth in the appended claims. All parts and percentages are by weight, unless otherwise stated.

Example I

A mixture of 5 grams of N-(cyclohexylidene)-aniline [prepared by condensation of cyclohexanone and aniline; see B. Witkop, J. Am. Chem. Soc., 78, 2873 (1956)] was refluxed, under nitrogen and with stirring, with 1.41 grams of sodium hydride in 50 ml. of dry toluene. After eight hours, 5.89 grams of butyl iodide were added to the sodium salt of N-(cyclohexylidene)-aniline and the solution was refluxed for another 16 hours. Hydrolysis by heating with 5% hydrochloric acid for twenty minutes and subsequent work up gave 2-butylcyclohexanone, B.P. 86–96° C. (15–20 mm.); 2,4-dinitrophenyl-hydrazone M.P. 113–114° C., identical with an authentic sample.

Example II

In three separate runs, the procedure employed in Example I was repeated in every detail with the exception that equivalent amounts of lithium amide, potassium amide and potassium hydride, respectively were employed in place of sodium hydride. In each case, a good yield of 2-butylcyclohexanone was obtained upon alkylation of the resulting imide salt with butyl iodide.

Example III

A mixture of 4.56 grams of N-(cyclohexylidene)-cyclohexylamine [prepared by the condensation of cyclohexanone and cyclohexylamine; see E. D. Bergmann, E. Zimkin and S. Pinchas, Rec. trav. chim. 71, 190 (1952)] was refluxed for two hours in 50 ml. of tetrahydrofuran with one equivalent of ethyl magnesium bromide. Addition of butyl iodide (9.6 grams) to the magnesium salt of N-(cyclohexylidene)-cyclohexylamine, followed by refluxing overnight gave, after hydrolysis by warming with excess 10% hydrochloric acid, work up and distillation, an 80% yield of 2-butylcyclohexanone, identical with an authentic sample.

Example IV

In exactly the same manner as that set forth in Example III, 6.46 grams of N-(cyclohexylidene)-cyclohexylamine was transformed into its magnesium salt by refluxing in tetrahydrofuran with one equivalent of ethyl magnesium bromide. Addition of one equivalent of butyl p-toluenesulfonate and refluxing overnight gave, after aqueous acid hydrolysis, work up and distillation, an 80% yield of 2-butylcyclohexanone.

Example V

In the same manner as that set forth in Example III, but using one equivalent of dimethyl sulfate as the alkylating agent, 2-methylcyclohexanone was obtained from N-(cyclohexylidene cyclohexylamine).

Example VI

In exactly the same manner as that set forth in Example III, but using one equivalent of isopropyl iodide as the alkylating agent, 2-isopropylcyclohexanone, B.P. 82–83° C. (15 mm.) was obtained in very good yield. The 2,4-dinitrophenylhydrazone had M.P. 135–136° C.

Example VII

By the same procedure as that set forth in Example III, but using one equivalent of allyl bromide for the alkylation, 2-allylcyclohexanone, B.P. 80–82° C. (15 mm.), was obtained in excellent yield. Its 2,4-dinitrophenylhydrazone melted at 144–145° C.

Example VIII

In the same manner as that set forth in Example III, but with one equivalent of β-phenylethyl bromide as the alkylating agent, a very good yield of 2-(β-phenylethyl)-cyclohexanone was obtained. It had a boiling point of 111–114° C. (0.2 mm.), and its 2,4-dinitrophenylhydrazone melted at 107.5°–108.5° C.

(Analysis.—Calcd. for $C_{20}H_{22}O_4N_4$: C, 62.81; H, 5.80. Found: C, 62.82; H, 5.76).

Example IX

By the same procedure as that set forth in Example III, but with benzyl chloride as the alkylating agent, a very good yield of 2-benzylcyclohexanone, B.P. 101–103° C. (0.1 mm.), was obtained. Its semicarbazone melted at 163–165° C.

Example X

In the same manner as that set forth in Example III, but with one equivalent of 1,3-dichloro-2-butene as the alkylating agent, an excellent yield of 2-(3-chloro-2-butenyl) cyclohexanone, B.P. 71–76° C. (0.15 mm.), was obtained.

Example XI

The procedure given in Example III was repeated with one equivalent of the ethylene glycol ketal of 2-bromoethyl methyl ketone as the alkylating agent. Aqueous acid hydrolysis after alkylation gave an excellent yield of $\Delta^{1,9}$-2-octalone, B.P. 70–73° C. (0.2 mm.), as a result of the hydrolysis of the ketal and cyclization of the alkylated imine.

Example XII

The imine prepared from cyclopentanone and cyclohexylamine gave, by the procedure of Example III, using one equivalent of butyl iodide for the alkylation step, an excellent yield of 2-butylcyclopentanone, B.P. 90–91° C. (18 mm.). Its 2,4-dinitrophenylhydrazone melted at 115–116° C.

Example XIII

In the same manner as that set forth in Example III, the imine obtained from cycloheptanone and cyclohexylamine gave, with one equivalent of methyl iodide as the alkylating agent, an excellent yield of 2-methylcycloheptanone, B.P. 70–75° C. (25 mm.). Its 2,4-dinitrophenylhydrazone melted at 117–119° C.

Example XIV

The imine obtained from 2-methylcyclohexanone and cyclohexylamine gave, by the procedure of Example III, a magnesium salt, which on alkylation with one equivalent of methyl iodide and hydrolysis as described in Example III gave, after distillation, 2,6-dimethylcyclohexanone in over 80% yield. 2,6-dimethylcyclohexanone 2,4-dinitrophenylhydrazone melted at 148–149° C., and was identical with an authentic sample.

Example XV

By the general procedure of Example III the imine obtained from 3-methylcyclohexanone and cyclohexylamine gave, after treatment with one equivalent of ethyl magnesium bromide in refluxing tetrahydrofuran, followed by addition of one equivalent of isopropyl iodide, hydrolysis, and work up as carried out in Example III, a good yield of an equilibrium mixture of menthone and isomenthone, B.P. 85–89° C. (20 mm.). The infrared spectrum of this mixture was identical with that of an equilibrium mixture of menthone and isomenthone obtained by acid treatment of menthone.

Example XVI

The imine obtained from methyl isopropyl ketone and cyclohexyl-amine was converted into its magnesium salt in the manner described in Example III and, after replacement of the tetrahydrofuran by toluene, addition of one equivalent of butyl iodide, refluxing for 23 hours, and aqueous acid hydrolysis, a very good yield of 2-methyl-3-octanone was obtained, B.P. 175–180° C. Its semicarbazone melted at 75–77° C.

Example XVII

The imine obtained from butyrophenone and cyclohexylamine was converted into its magnesium salt in the manner described in Example III, using propyl magnesiumiodide as the salt-forming agent. Then, after replacing the tetrahydrofuran with xylene, addition of one equivalent of methyl p-toluenesulfonate, refluxing for 18 hours, and aqueous sulfuric acid hydrolysis, a good yield of 2-methylbutyrophenone was obtained.

Example XVIII

The imine obtained from methyl amyl ketone and cyclohexylamine was refluxed in tetrahydrofuran with a mixture of one equivalent of ethyl magnesium bromide and one equivalent of butyl bromide at reflux temperature for 18 hours. After hydrolysis with aqueous acid a very good yield of a mixture [B.P. 88–92° C. (10 mm.)] of 3-butyl-2-heptanone and 6-undecanone, in a ratio of 19% of the former to 79% of the latter, was obtained.

Example XIX

In the manner set forth in Example III the magnesium salt of the imine obtained from isobutyraldehyde and t-butylamine was alkylated with one equivalent of benzyl chloride to give an 80% yield of 2,2-dimethyl-3-phenylpropionaldehyde, B.P. 47–57° C. (0.5 mm.). Its 2,4-dinitrophenylhydrazone melted at 150–152° C.

Example XX

In the manner set forth in Example III the magnesium salt of the imine obtained from isobutyraldehyde and cyclohexylamine was alkylated with one equivalent of butyl iodide to give a very good yield of 2,2-dimethylhexanal, B.P. 65–67° C. (40 mm.). The 2,4-dinitrophenylhydrazone melted at 135–135.5° C.

Example XXI

In the manner set forth in Example III the magnesium salt of the imine prepared from isobutyraldehyde and cyclohexylamine gave on alkylation with one equivalent of 1-bromo-2-butene an excellent yield of 2,2-dimethyl-4-hexenal, B.P. 47–50° C. (20 mm.). Its 2,4-dinitrophenylhydrazone melted at 121–122.5° C.

Example XXII

The imine prepared from propionaldehyde and t-butylamine gave, on refluxing for ten hours with one equivalent of ethyl magnesium bromide and one equivalent of butyl bromide, followed by acid hydrolysis, a good yield of 2-methylhexanal, B.P. 135–142° C. Its semicarbazone melted at 90–91° C.

Example XXIII

The magnesium salt of the imine obtained from heptaldehyde and t-butylamine, on alkylation with one equivalent of butyl iodide by the method set forth in Example III, gave a good yield of 2-butylheptanal, B.P. 41–48° C. (0.05 mm.). The 2,4-dinitrophenylhydrazone melted at 107.5–108° C.

Example XXIV

The magnesium salt of the imine obtained from 3-cyclohexene-1-carboxaldehyde and cyclohexylamine gave, on alkylation with ethyl bromide by the procedure of Example III, a good yield of 1-ethyl-3-cyclohexene-1-carboxaldehyde.

Example XXV

The magnesium salt of the imine obtained from crotonaldehyde and t-octylamine gave, on alkylation with methyl iodide by the procedure of Example III, a good yield of tiglic aldehyde.

Example XXVI

The magnesium salt of the imine obtained from cyclohexylamine and cholestanone gave, on alkylation with methyl iodide by the procedure of Example III, 2-methylcholestanone, identical with an authentic sample.

Example XXVII

The magnesium salt of the imine prepared from methylamine and 10-methyl $\Delta^{1,9}$-2-octalone gave by the procedure of Example III using one equivalent of $\beta$-phenylethylbromide followed by hydrolysis with a sodium acetate-acetic acid-water mixture, a good yield of 1-$\beta$-phenylethyl-10-methyl $\Delta^{1,9}$-2-octalone.

It will be obvious to those skilled in the art that other changes and variations can be made in carrying out the present invention without departing from the spirit and scope thereof as defined in the appended claims.

I claim:
1. A method of alkylating an enolizable organic carbonyl compound to produce an $\alpha$-alkylated derivative thereof which comprises:
   (A) condensing said enolizable organic carbonyl compound with a primary amine to give the corresponding imine,
   (B) converting said imine to a salt selected from the group consisting of alkali metal and magnesium salts thereof,
   (C) reacting the resulting imine salt with an alkylating agent selected from the group consisting of primary and secondary alkyl, alkenyl having no $\alpha,\beta$-ethylenic unsaturation, and aralkyl halides, sulfates and sulfonates, and
   (D) hydrolyzing the resulting alkylation mixture to produce an $\alpha$-alkylated organic carbonyl compound.

2. In a method of alkylating an enolizable organic carbonyl compound to produce an $\alpha$-alkylated derivative thereof, the step which comprises reacting (1) a salt selected from the group consisting of alkali metal and magnesium salts of an imine prepared by condensing said enolizable organic carbonyl compound and a primary amine with (2) an alkylating agent selected from the group consisting of primary and secondary alkyl, alkenyl having no $\alpha,\beta$-ethylenic unsaturation, and aralkyl halides, sulfates and sulfonates.

3. The method of claim 2 wherein the enolizable organic carbonyl compound is an aldehyde.

4. The method of claim 2 wherein the enolizable organic carbonyl compound is a ketone.

5. The method of claim 2 wherein the enolizable organic carbonyl compound is an aldehyde which is monosubstituted on the $\alpha$-carbon atom.

6. The method of claim 2 wherein the enolizable organic carbonyl compound is an aldehyde which is disubstituted on the $\alpha$-carbon atom.

7. The method of claim 2 wherein the enolizable organic carbonyl compound is a ketone which is monosubstituted in the $\alpha$-carbon atom.

8. The method of claim 2 wherein the enolizable organic carbonyl compound is a ketone which is disubstituted on the $\alpha$-carbon atom.

9. The method of claim 2 wherein the enolizable organic carbonyl compound is an acylic aldehyde.

10. The method of claim 2 wherein the enolizable organic carbonyl compound is a cyclic aldehyde.

11. The method of claim 2 wherein the enolizable organic carbonyl compound is an acylic ketone.

12. The method of claim 2 wherein the enolizable organic carbonyl compound is a cyclic ketone.

13. The method of claim 2 wherein the enolizable organic carbonyl compound is an $\alpha,\beta$-unsaturated aldehyde.

14. The method of claim 2 wherein the enolizable organic carbonyl compound is an $\alpha,\beta$-unsaturated ketone.

15. The method of claim 2 wherein the enolizable organic carbonyl compound is an aldehyde of the cyclopentanopolyhydrophenanthrene series.

16. The method of claim 2 wherein the enolizable organic carbonyl compound is a ketone of the cyclopentanopolyhydrophenanthrene series.

17. The method of claim 2 wherein the primary amine is an aromatic amine and the imine salt is the sodium salt.

18. The method of claim 2 wherein the imine salt is the magnesium salt.

19. The method of claim 2 wherein the primary amine is aniline and the imine salt is the sodium salt obtained by reacting the imine with sodium hydride.

20. The method of claim 2 wherein the imine salt is the magnesium salt obtained by reacting the imine with a Grignard reagent.

No references cited.

LEWIS GOTTS, *Primary Examiner.*